Figure 1:
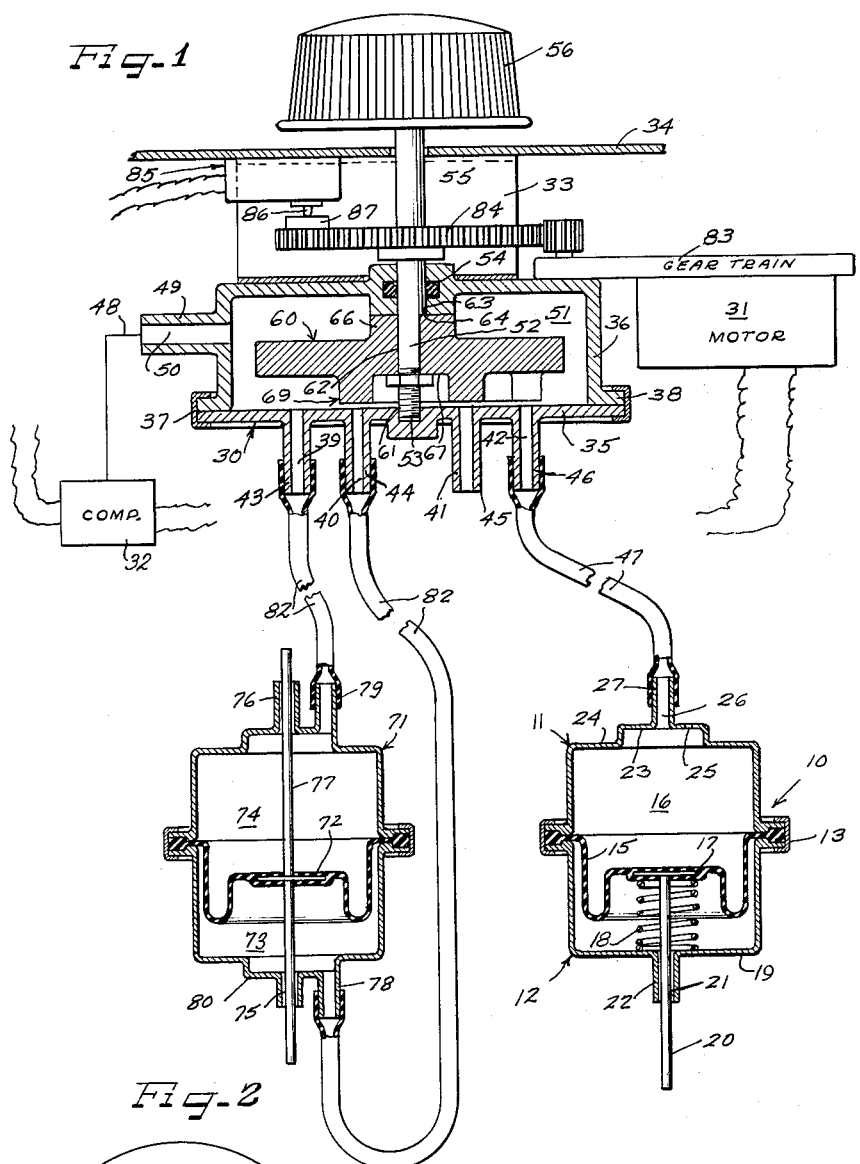

Nov. 9, 1965     R. W. COUFFER, JR., ETAL     3,216,325
PNEUMATIC CONTROL SYSTEM
Filed April 16, 1962

INVENTOR.
Robert W. Couffer, Jr.
BY Joseph M. Algino

ATTORNEYS

United States Patent Office 3,216,325
Patented Nov. 9, 1965

3,216,325
PNEUMATIC CONTROL SYSTEM
Robert W. Couffer, Jr., Deerfield, and Joseph M. Algino, Chicago, Ill., assignors to The Dole Valve Company, Morton Grove, Ill., a corporation of Illinois
Filed Apr. 16, 1962, Ser. No. 187,573
1 Claim. (Cl. 91—36)

The present invention relates to pneumatically actuatable control systems and specifically relates to an improved form thereof which incorporates a movable wall which is moved selectively between two opposed extreme positions as a function of differential positive forces acting thereon.

It will be understood by those skilled in this art that pneumatic control systems of the type generally referred to above are ordinarily provided with a movable wall or diaphragm which is spring biased in one direction and which is movable by the force of air pressure acting thereon in opposition to the spring bias. In the past, such units have been arranged with valve means for turning on and shutting off the flow of air to a chamber on one side of the diaphragm and for alternately closing and opening a vent to that chamber. When air under pressure is forced into the chamber and the vent closed the diaphragm will be moved in opposition to the spring bias and such movement of the diaphragm will be transmitted to various control elements such as an electric switch or a valve head or a gear or the like. A device such as this requires separate valving ceans for the inlet to the chamber and for the vent from that chamber.

The structure which we have devised incorporates a casing having a movable wall extending across the interior thereof and defining a chamber and an inlet to and vent from the chamber. Unlike its prior counterpart, the structure which we have devised has a vent to the chamber which is open at all times and which has an effective flow area somewhat smaller than the inlet to the chamber. We provide means for modulating the rate of flow of air through the inlet to the chamber but no valve means are provided for completely shutting off the flow of air to the chamber or for closing the vent.

We have discovered that a pneumatic control system based upon this principle of operation has many advantages not found in prior pneumatic control systems. First, the design is simple and the structure can be cheaply constructed from metal or plastic parts as desired. More important is the fact that the device which we employ for modulating the rate of flow of air to the chamber performs no real work operation other than mere free rotation in its respective valve housing and the only frictional resistance to its operating motion of any significance is the rotation of its shaft within the housing. As a result the modulating member can be rotated or driven as desired by a very low torque drive mechanism. Still further, since air flows continuously to the chamber as long as the air compressor is energized the vent from the chamber will remain clear at all times. We employ what may be referred to as a timing cam for effecting the desired modulation of the air flowing to the chamber and this cam has contact with no other member but its own mounting shaft. The extent or duration of modulation by the timing cam can readily be altered merely by substituting one cam for another if it is necessary to use the control system for different installations and to different purposes and thus has a considerable advantage over many of its counterparts which required considerable alteration of a number of parts in order to effect different timing functions.

In view of the foregoing it is a principal object of our invention to provide a pneumatic control system requiring a very low torque or low output drive which incorporates a movable wall operating on the pressure differential principle.

A further object of our invention resides in the provision of a system of the type above described wherein forces are positively applied to each side of the movable wall at all times and movement of the wall is effected merely by varying the differential in forces applied across the movable wall.

Yet another object of our invention is directed to the provision of a system of the type above described which employs no air shut-off valves but which controls operation of one or more components merely by modulating an air flow.

Figure 2:
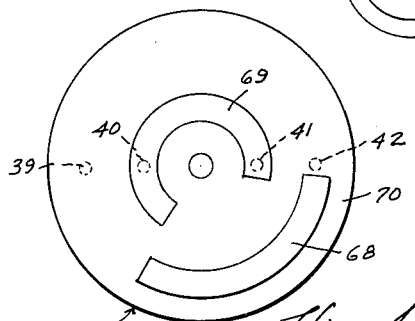

These and other objects of our invention will become apparent from time to time as the following specification proceeds and with reference to the accompanying drawings, wherein:

FIGURE 1 is a vertical sectional view through a pneumatic control system constructed in accordance with the principles of our invention; and FIGURE 2 is a plan view of the face of a timing cam which might be employed in our invention showing the cam lobes thereof in position relative to the air outlets from the housing for the cam.

Referring initially to FIGURE 1, a two-part casing 10 consists of upper and lower sections 11 and 12, respectively, which are secured together by means of a ring 13 gripping outwardly extending mating flanges 14 of each of the sections. A movable wall or diaphragm 15 has its periphery sandwiched between the flanges 14 and serves to divide the interior of the casing 10 into upper and lower chambers 16 and 17, respectively. The diaphragm 15 has a stiffening plate 17 underlying a center section thereof and a compression spring 18 is interposed between the end wall 19 of the section 12 and the stiffening plate 17 to bias the diaphragm 15 in a direction to decrease the volumetric capacity of the chamber 16.

A drive rod or attachment means 20 is secured to the stiffening plate 17 and is slidably guided within a bore 21 formed in a central boss 22 in the end wall 19. The rod 20 constitutes the power output of the pneumatic control system and may be connected to an electrical switch or switches, a leverage system, a gearing mechanism, or a valve head or the like depending upon the function which it is to be perform as will be well understood by those adept in this art.

A recess 23 is formed within the end wall 24 of the upper section 11 and has a vent port 25 formed therein which communicates the chamber 16 with the atmosphere. Similarly, an inlet passage 26 is formed within an outwardly extending nipple 27 and opens through the recess 23 to the chamber 16. The effective flow area of the inlet passage 26 is greater than the effective flow area of the vent port 25 for reasons which will become obvious. In addition, note should be made of the fact that if there is not sufficient passage between the rod 20 and the wall of the bore 21 to permit the escape of air trapped within the chamber 17, that chamber could also be vented in the same manner as the chamber 16 is vented.

In operation, air continuously flows through the inlet passage 26 to the chamber 16 and thence through the vent port 25. The spring 18 has a biasing force of such a small magnitude that it will compress and permit movement of the diaphragm 15 toward the end wall 19 when there is a full flow of air through the inlet passage 26. It will be understood that under such circumstances, the pressure will build up within the chamber 16 since air is flowing through the inlet 26 faster than it is flowing out of the vent 25. On the contrary, when the rate of flow of air through the inlet passage 26 is reduced below the rate of flow of air through the vent port 25 the pressure of air contained within the chamber 16 will reduce until the biasing force of the spring 18 exceeds the force of pressurized air acting on the upper surface of the diaphragm 15. At such time the diaphragm 15 will move upwardly within the casing 10.

The timing mechanism for controlling actuation of the diaphragm 15 comprises generally a timing housing 30, a synchronous motor 31, and a compressor 32. The housing 30 is connected by means of a bracket 33 to the front or top wall 34 of an appliance. The housing 30 is cup-shaped in configuration and has a cover plate 35 secured to the base portion 36 thereof by means of a bracket 37 clamping a peripheral edge of the cover plate 35 to an outwardly extending flange 38 of the body 36. A plurality of outlet passages 39 through 42 are formed within outwardly extending nipples 43 through 46 which are integral with the cover plate 35. Tubing 47 serves to interconnect the nipple 27 with the nipple 46 to communicate air from the interior of the housing 30 to the chamber 16. The compressor 32 is connected by means of an inlet line 48 with an inlet nipple 49 formed integrally with and extending outwardly from the base section 36 to force air under pressure through an inlet passage 50 formed therein to the chamber 51 formed within the interior of the housing 30.

A shaft 52 has an end rotatably received within a central recess 53 formed on the inner surface of the cover plate 35 and is journaled for rotatable movement within a bore 53 formed centrally in the base section 36. An O-ring 54 is seated within a recess formed in the base section around the bore 53 and serves to provide a fluid tight seal around the shaft 52. The outermost end of the shaft 52 extends through an aperture 55 formed within the appliance wall 34 and has a knob 56 fitted on the outermost end thereof which is keyed to the shaft 52 to provide a means for rotating the shaft as desired.

A timing cam 60 is mounted on the shaft 52 for correlatable movement therewith and is fitted on the shaft and keyed thereto in the following manner: The shaft 52 has a bevel 61 formed along one surface thereof and running upwardly from the inner end thereof. A complementarily shaped bore 62 is formed centrally within the timing cam 60 to key the timing cam to the shaft. The beveled edge of the shaft 52 terminates in a shoulder 63 and this shoulder serves as a seat for a shoulder 64 formed intermediate the bore 62 and a diametrically enlarged section of the bore 65 which is formed within the hub 66 of the timing cam 60. The timing cam is maintained in its proper position by means of a nut or nuts 67.

The timing cam has a pair of cam lobes 68 and 69 formed on the face 70 thereof. The timing cam is so mounted within the housing 30 and the lobes are so formed that no part of the timing cam contacts any part of the housing 30. The lobes 68 and 69 however are positioned in juxtaposition though not in contact with the inner surface of the cover plate 35.

As best viewed in FIGURE 2, the cam lobe 68 is positionable directly over the outlet passages 39 and 42. When the lobe 68 is positioned over either of these passages the rate of flow of pressurized air through that passage is considerably reduced although not shut off. It is in this manner that modulation of the air flowing to the chamber 16 is controlled.

The cam lobe 69 is positioned radially inwardly of the lobe 68 and is positionable, in different rotative positions of the timing cam over the apertures 40 and 41 to control the rate of flow of air through those passages.

The rate of flow of air through an outlet passage in the cover plate 35 is therefore reduced by positioning a cam lobe over the port through which the passage opens to the chamber 51. Once the timing cam is rotated within the housing, as by rotation of the knob 56, and the cam is not situated over an outlet port there will be a relatively free and full flow of air through that passage.

As exemplary of one possible modification of our pneumatic control system we have also shown a two-part casing 71 having a diaphragm 72 extending across the interior thereof and dividing the interior of the casing into chambers 73 and 74. In this embodiment of our invention pneumatic bias is used on each side of the diaphragm 72 rather than the spring bias employed in the casing 10. In this arrangement of our invention the chambers 73 and 74 are vented through the slight space between the inner side walls of guide bosses 75 and 76 and the connecting rod 77. The rod 77 is secured to the diaphragm 72 and moves therewith and is loosely guided for movement within the guide bosses 75 and 76. Inlet nipples 78 and 79 are formed within the end walls 80 and 81 at opposite ends of the casing and are connected by means of suitable tubing 82 to the outlet nipples 44 and 43, respectively. The cam lobes 68 and 69 may be arranged as shown so that in any given position of the timing cam there will be an air pressure build up in one of the chambers 73 or 74 to position the diaphragm 72 in one or the other of two extreme positions.

It should be borne in mind that nearly any desired operating characteristic can be achieved merely by changing the lengths and configurations of the cam lobes. For instance, the lobe may extend sharply outwardly from the face 70 of the timing cam or there may be a very gradual slope between the "top" of a lobe and the face 70. In the latter case the rate of flow of air through an outlet passage can be varied quite gradually while in the former case the rate of flow of air through an outlet passage will change quite abruptly.

The motor 31 is connected through a gear train 83 with a large diameter gear 84 keyed to the shaft 52 to effect slow continuous rotation of that shaft. Such an arrangement is well understood by those skilled in the art and is not here further described.

Still further, the motor 31 and compressor 32 can be energized through a switch 85. In such an arrangement the switch could be mounted on the bracket 33 and have a switch arm 86 cooperable with a small cam 87 protruding from a face of the large diameter gear 84. Under such an arrangement rotation of the knob would act to energize the compressor and motor both and the motor would continue to drive the shaft 52 through the gear train 83 and gear 84 until the cam 87 once again contacted the switch blade 86. At such time the motor and compressor would both be shut off. This arrangement too is well understood by those adept in this art and constitutes no part of this invention and so is here further described.

It will be understood that many modifications and variations of our invention may be effected without departing from the spirit and scope of the novel concepts thereof.

We claim as our invention:

A pneumatic control system comprising:
a casing having opposed end walls and a side wall;
a diaphragm extending across the interior of said casing and connected to said side wall thereof;
first and second chambers formed within said casing on opposite sides of said diaphragm;
an inlet and a relatively smaller vent opening opening to said first and said second chamber, respectively, through each of said end walls of said casing;
a housing having outlets;
means directing air under pressure to the interior of said housing;
means communicating each of said outlets with one of said inlets;
a continuous flow of air within said communicating means;
a timing cam rotatably mounted within said housing having at least one lobe movable into juxtaposition with each of said outlets without contacting the wall of said housing defining said outlets to modulate the flow of air through said outlets;
motor and independent override type manual means for effecting rotatable movement of said cam;

whereby modulation of air flowing through said outlet to said inlet is effective to render the force of pressurized air acting on one side of said diaphragm greater or lesser than the opposing biasing force of pressurized air acting against the opposite side thereof to control movement of said diaphragm.

References Cited by the Examiner

UNITED STATES PATENTS

| | | |
|---|---|---|
| 1,158,029 | 10/15 | Dantsizen. |
| 2,116,022 | 5/38 | Gross _____ 123—190 |
| 2,126,892 | 8/38 | Kenyon. |
| 2,250,344 | 7/41 | Alkan. |
| 2,361,206 | 10/44 | Hoppe. |
| 2,423,843 | 7/47 | Metsger. |
| 2,718,878 | 9/55 | Du Bois. |
| 2,863,287 | 12/58 | Berkman. |
| 2,884,905 | 5/59 | Jensen _____ 91—52 |
| 2,904,057 | 9/59 | Callender et al. _____ 137—624 X |
| 2,928,606 | 3/60 | Lee. |
| 2,938,502 | 5/60 | Neal _____ 91—52 |

FRED E. ENGELTHALER, *Primary Examiner.*